US 012483497B2

(12) United States Patent
Towles et al.

(10) Patent No.: US 12,483,497 B2
(45) Date of Patent: Nov. 25, 2025

(54) VIRTUAL CHANNEL BALANCING IN RING-BASED TOPOLOGIES

(71) Applicant: Google LLC, Mountain View, CA (US)

(72) Inventors: Brian Patrick Towles, Chapel Hill, NC (US); Hojat Parta, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/665,159

(22) Filed: May 15, 2024

(65) Prior Publication Data

US 2024/0305558 A1    Sep. 12, 2024

Related U.S. Application Data

(63) Continuation of application No. 17/966,134, filed on Oct. 14, 2022, now Pat. No. 12,058,029.

(51) Int. Cl.
*H04L 45/00* (2022.01)
*H04L 49/102* (2022.01)

(52) U.S. Cl.
CPC .............. *H04L 45/20* (2013.01); *H04L 45/22* (2013.01); *H04L 49/102* (2013.01)

(58) Field of Classification Search
CPC ......... H04L 45/00; H04L 49/351; H04L 9/40; H04L 47/10; H04L 69/16; H04L 49/352; H04L 12/42; H04L 45/245; H04L 69/161; H04L 49/354; H04L 47/2458; H04L 45/742; H04L 49/602; H04L 47/125;
(Continued)

(56) References Cited

U.S. PATENT DOCUMENTS 6,101,181 A    8/2000  Passint et al.
7,809,006 B2  10/2010  Towles
(Continued)

FOREIGN PATENT DOCUMENTS

CN    108111410 A    6/2018
EP      3328008 A1    5/2018
(Continued)

OTHER PUBLICATIONS

William J. Dally and Charles L. Seitz, "Deadlock-Free Message Routing in Multiprocessor Interconnection Networks," IEEE Transactions on Computers, May 1987, pp. 547-553.
(Continued)

*Primary Examiner* — Djenane M Bayard
(74) *Attorney, Agent, or Firm* — Lerner David LLP (57) ABSTRACT

Systems and method for routing data packets in ring network. A data packet being transmitted to a destination node may be received by a first structure at a first node. The first node may determine a number of hops the data packet will traverse as it is transmitted from the first node to the destination node and compare the determined number of hops to a threshold hop value to determine whether the number of hops is equal to or less than the threshold hop value. If the number of hops is greater than the threshold, the data packet may be transmitted to a dimension queuing structure for a first virtual channel within a second node, otherwise, the data packet may be transmitted to a dimension queuing structure for a second virtual channel or a turn queuing structure within the second node.

20 Claims, 7 Drawing Sheets

(58) Field of Classification Search
CPC ..... H04L 49/102; H04L 45/24; H04L 1/0025; H04L 1/0032; H04L 12/4625; H04L 12/5601; H04L 49/109; H04L 49/3081; H04L 61/00; H04L 1/0002; H04L 1/1671; H04L 1/1685; H04L 47/2408; H04L 47/2441; H04L 69/14; H04L 49/90; H04L 67/10; H04L 12/46; H04L 69/18; H04L 1/0003; H04L 67/12; H04L 63/0272; H04L 1/20; H04L 12/189; H04L 69/163; H04L 69/165; H04L 69/169; H04L 12/437; H04L 12/1836; H04L 45/04; H04L 12/1813; H04L 45/18; H04L 69/168; H04L 12/4637; H04L 45/50; H04L 12/422; H04L 12/427; H04L 2012/5612; H04L 12/433; H04L 2012/5618; H04L 2012/5627; H04L 2012/5638; H04L 2012/5656; H04L 2012/5665; H04L 45/586; H04L 45/247; H04L 45/30; H04L 45/38; H04L 45/22; H04L 47/50; H04L 12/2852; H04L 45/20; H04L 47/2433; H04L 47/30; H04L 47/522; H04L 47/562; H04L 47/6215; H04L 47/6255; H04L 12/1881; H04L 12/4633; H04L 41/0894; H04L 41/0895; H04L 41/5003; H04L 41/5096; H04L 43/0876; H04L 43/10; H04L 43/16; H04L 45/122; H04L 45/127; H04L 45/28; H04L 47/24; H04L 47/29; H04L 47/32; H04L 47/6225; H04L 49/201

See application file for complete search history.

(56) References Cited

U.S. PATENT DOCUMENTS

| | | | |
|---|---|---|---|
| 7,940,666 B2 * | 5/2011 | Beigne | H04L 12/56 370/236 |
| 2002/0173973 A1 | 11/2002 | Cirinna et al. | |
| 2008/0123679 A1 | 5/2008 | Scott et al. | |
| 2009/0046727 A1 | 2/2009 | Towles | |
| 2012/0195314 A1 * | 8/2012 | Ramanujam | H04L 45/122 370/392 |
| 2015/0222533 A1 * | 8/2015 | Birrittella | H04L 5/0055 370/392 |
| 2016/0344629 A1 | 11/2016 | Gray | |
| 2017/0085463 A1 * | 3/2017 | Lih | H04L 12/42 |

FOREIGN PATENT DOCUMENTS

| | | |
|---|---|---|
| JP | H10506736 A | 6/1998 |
| WO | 9632681 A1 | 10/1996 |

OTHER PUBLICATIONS

Jeff Draper and Fabrizio Petrini, "Routing in Bidirectional k-ary n-cubes with the Red Rover Algorithm," Proceedings of the International conference on Parallel and Distributed Processing Techniques and Applications, Jun. 1997, pp. 1184-1193.

International Search Report and Written Opinion for International Application No. PCT/US2023/024825 dated Sep. 26, 2023. 13 pages.

Office Action for Chinese Patent Application No. 202380012275.4 dated Nov. 12, 2024. 9 pages.

Office Action for Japanese Patent Application No. 2023-577729 dated Feb. 18, 2025. 3 pages.

* cited by examiner

VIRTUAL CHANNEL BALANCING IN RING-BASED TOPOLOGIES

CROSS REFERENCE TO RELATED APPLICATION

The present application is a continuation of U.S. patent application Ser. No. 17/966,134, file Oct. 14, 2022, the disclosure of which is hereby incorporated herein by reference.

BACKGROUND

Ring-based network topologies, such as multi-dimensional torus and twisted torus networks, are typically used in on-chip and off-chip networks. These network topologies may suffer from deadlock. Deadlock occurs when a chain of packets is waiting on each other to make progress through the network and the chain forms a cycle that prevents any of the packets from progressing. Typical approaches to ensure a deadlock-free network topology include using a dateline or a red-rover algorithm, both of which rely on virtual channels. However, the use of virtual channels may result in reduced performance of the network topology due to imbalanced distributions of the data packets throughout the network. Moreover, the use of a dateline may create long virtual channel dependency chains, which can lead to compounding unfairness and loss of throughput as the number of nodes per dimension increases.

BRIEF SUMMARY

This technology is directed to routing data packets through a ring-based network without deadlock. In one aspect, the technology is directed to a method of routing data packets within a ring network, the method includes receiving, at a first queueing structure within a first node of the ring network, a data packet to be transmitted to a destination node. The method may also include determining, by the first node, a number of hops the data packet will traverse as it is transmitted from the first node to the destination node of the ring network. The method may also include comparing, by the first node, the number of hops to a threshold hop value to determine whether the number of hops is equal to or less than the threshold hop value.

The method may also include transmitting, by the first node, the data packet to (i) a dimension queuing structure for a first virtual channel within a second node of the ring network if the number of hops is greater than the threshold hop value, or (ii) a dimension queuing structure for a second virtual channel or a turn queuing structure within the second node if the number of hops is equal to or less than the threshold hop value.

In some instances, the first queueing structure within the first node is a turn queueing structure.

In some instances, the data packet is transmitted to the turn queueing structure within the second node when the second node is the destination node.

In some instances, the network includes a first dateline and a second dateline. In some examples, the first dateline and the second dateline are each positioned between a pair of network nodes on the ring network, wherein a number of nodes positioned between the first dateline and the second dateline matches a number of nodes positioned between the second dateline and the first dateline.

In some examples, the first node may also further determine whether the data packet will traverse a dateline as it is transmitted from the first node to the destination node. In some examples, the data packet is transmitted to the dimension queueing structure for the first virtual channel within the second node when it is determined the data packet will traverse the dateline.

In some instances, the method further includes: determining, by the second node after receiving the data packet, a second number of hops the data packet will traverse as it is transmitted from the second node to the destination node of the ring network; comparing, by the second node, the number of hops to the threshold hop value to determine whether the second number of hops is equal to or less than the threshold hop value; and transmitting, by the second node, the data packet to: (i) a dimension queuing structure for the first virtual channel within a third node of the ring network if the number of hops is greater than the threshold hop value; or (ii) a dimension queuing structure for a second virtual channel or a turn queuing structure within the third node if the number of hops is equal to or less than the threshold hop value.

In some instances, the data packet may be transmitted to the turn queueing structure within the third node when the third node is the destination node.

In some instances, the network is a ring network, wherein the ring network is a single dimension of a torus or a twisted torus network.

In another aspect, the technology may include a ring network including a first node having a first queueing structure. The ring network may include a second node having a dimension queuing structure for a first virtual channel and a dimension queuing structure for a second virtual channel. The ring network may also include a destination node, where the first node is configured to receive, at the first queueing structure, a data packet to be transmitted to the destination node. The ring network may also include a destination node. The first node may be configured to determine a number of hops the data packet will traverse as it is transmitted from the first node to the destination node of the ring network; compare the number of hops to a threshold hop value to determine whether the number of hops is equal to or less than the threshold hop value.

The first node of the ring network may be configured to transmit the data packet to (i) the dimension queueing structure for the first virtual channel if the number of hops is greater than the threshold hop value, or (ii) the dimension queuing structure for the second virtual channel if the number of hops is equal to or less than the threshold hop value.

In some instances, the first queueing structure within the first node of the ring network may be a turn queueing structure.

In some instances, the ring network may include a first dateline and a second dateline. In some examples, the first dateline and the second dateline are each positioned between a pair of network nodes on the ring network, wherein a number of nodes positioned between the first dateline and the second dateline matches a number of nodes positioned between the second dateline and the first dateline. In some examples, the ring network includes more than eight nodes.

In some instances, the first node may be further configured to determine whether the data packet will traverse a dateline as it is transmitted from the first node to the destination node.

In some instances, the second node may be configured to: determine, after receiving the data packet, a second number of hops the data packet will traverse as it is transmitted from the second node to the destination node of the ring network;

compare, by the second node, the number of hops to the threshold hop value to determine whether the second number of hops is equal to or less than the threshold hop value; and transmit the data packet to: (i) a dimension queuing structure for the first virtual channel within a third node of the ring network if the number of hops is greater than the threshold hop value; or (ii) a dimension queuing structure for the second virtual channel or a turn queuing structure within the third node if the number of hops is equal to or less than the threshold hop value.

In some instances, the data packet is transmitted to the turn queue structure within the third node when the third node is the destination node.

In some instances, in the ring network is a torus ring or a twisted tori.

Other technical features may be readily apparent to one skilled in the art from the following figures, descriptions, and claims.

BRIEF DESCRIPTION OF THE DRAWINGS

A more complete appreciation of the disclosure and many of the attendant advantages thereof will be readily obtained by reference to the following detailed description when considered in connection with the accompanying drawings, wherein.

DETAILED DESCRIPTION

The technology described herein is directed to improving the performance of ring-based network topologies while ensuring deadlock-free operation by shortening dependency chains and efficiently load balancing the virtual channel (VC) resources of the network. In this regard, the dependency chains may be shortened by adding an additional dateline such that the two datelines are separated by half the diameter of the ring. Increasing the efficiency of the load balancing between the VC resources may include switching a data packet to a second VC at any time, so long as that data packet will not cross one of the datelines.

Figure 1:
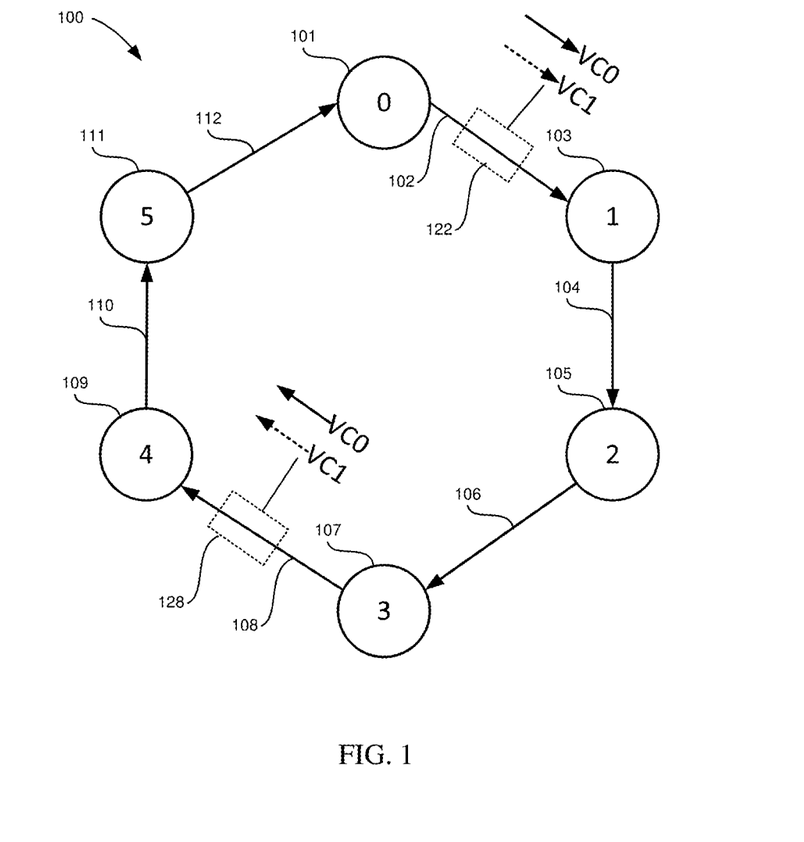
FIG. 1 illustrates an example ring network, in accordance with aspects of the disclosure.

In a ring-based network topology, nodes that form the network may be connected via physical links, such as wires, cables, traces, etc. Each physical link may carry data packets on any number of VCs. In this regard, each physical link between a pair of nodes can communicate data packets via one or more VCs. For example, and as illustrated in the ring network 100 of FIG. 1, each node pair is connected via a physical link. For instance, node0 101 is connected to node1 103 via physical link 102, node1 103 is connected to node2 105 via physical link 104, node2 105 is connected to node3 107 via physical link 106, node3 107 is connected to node4 109 via physical link 108, node4 109 is connected to node5 111 via physical link 110, and node5 111 is connected to node0 101 via physical link 112. Each physical link 110-112 in ring network 100 includes two virtual channels VC0 and VC1, as illustrated by callouts 122 and 128, which illustrate VC0 (as a solid line) and VC1 (as a dashed line) for connections 102 and 108, respectively. For clarity, FIG. 1 illustrates the VCs only for connections 102 and 108, but it should be understood that the other connections, including connections 104, 106, 110, and 112 also include virtual channels VC0 and VC1. Although ring network 100 includes only six nodes (0-5) and two virtual channels (VC0 and VC1) a ring network may include any number of nodes and any number of virtual channels.

Nodes may include any type of computing resource capable of communicating with other computing resources. For instance, nodes may include computers, servers, mobile devices, processors, cores, routers, memory, cards (e.g., accelerator cards), FIFOs, or other such queues, etc. In some instances, nodes may include a collection of computing resources, such as processors with routers, etc.

Selection of the VC on which to transmit a data packet may be static. In static routing, the routes may be predetermined and fixed. Mechanically, the static routes can be stored in tables, such as within RAM memory within the node. The destination of a packet may be used to index a table and lookup the route to the destination.

Datelines

In ring-based network topologies, dateline routing is used to designate one physical link in each direction of a ring as a dateline. In this regard, the physical links may be bidirectional links, such that both directions in a ring can be treated separately. Queueing structures are typically programmed to transmit each data packet on a first channel. In the event the data packets cross the dateline, the data packets are moved to the second virtual channel until the data packets reach their respective destination nodes.

Figure 2:
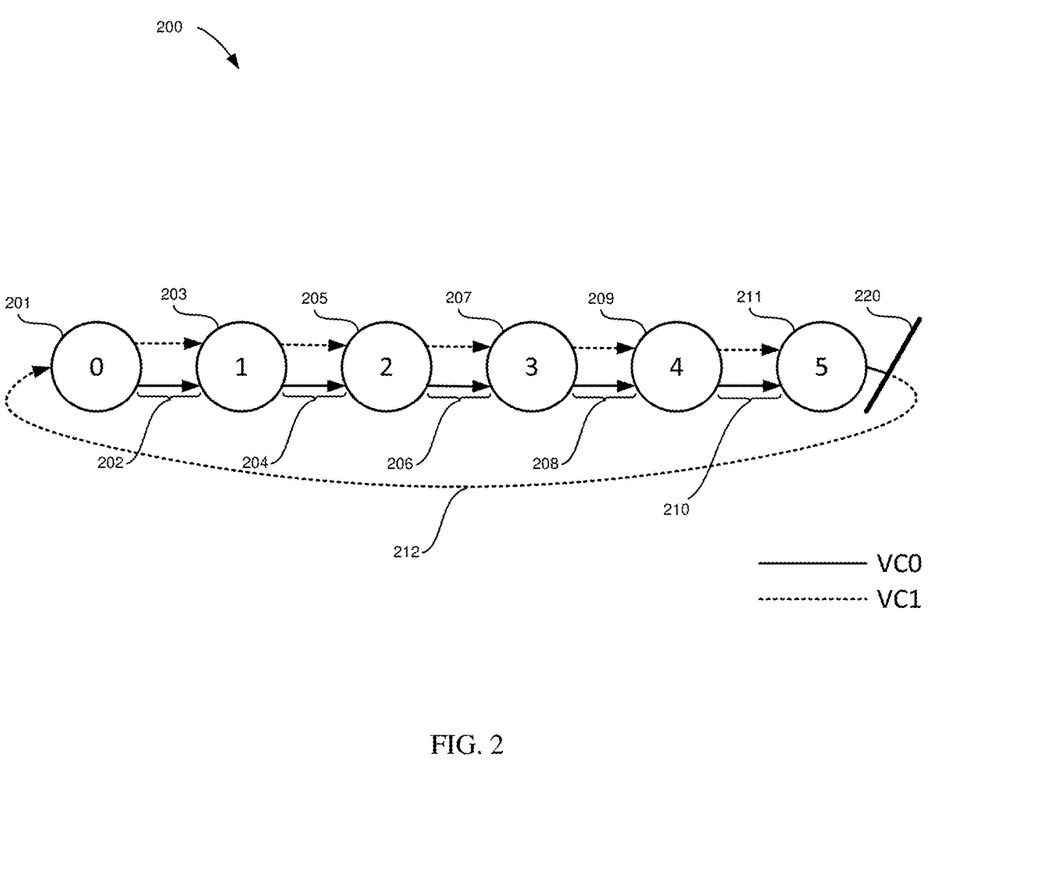
FIG. 2 illustrates an example ring network having virtual channels, in accordance with aspects of the disclosure.

For example, and as illustrated in ring network 200 of FIG. 2, which may be compared to ring network 100, a dateline 220 is positioned between nodes 211 and 201. The ring network 200 includes six nodes 201-211, and physical links between each adjacent node, including physical links 202, 204, 206, 208, 210, and 212. Each physical link includes two virtual channels VC0 (illustrated as a solid line) and VC1 (illustrated as a dashed line), with the exception of physical link 212, which may be considered a transition link that transfers the data packets between VC0 and VC1. To illustrate the transition from VC0 to VC1, FIG. 2 illustrates physical link 212, between node5 211 and node0 201, as a single line, with the line being solid on the left side of dateline 220 and dashed on the right side of dateline 220.

As data packets traverse the network 200, a routing algorithm may initially route the data packets on VC0. However, in the event a data packet crosses the dateline 220, the routing algorithm may switch the data packet to VC1 and subsequently route the data packet on VC1 to its destination node. As most data packets reach their respective destination nodes prior to passing the dateline 220, a spiral-like chain of acyclic VC dependencies is created. This chain of acyclic dependencies is sufficient to ensure that ring network 200 is deadlock-free. However, the dateline routing creates a chain of VC dependencies longer than the ring network itself.

While no individual packet will travel along the entirety of the chain, created by VC0 and VC1, a sequence of dependent packets can be blocked along the chain. To advance blocked data packets, queueing structures of network 200 may implement an arbitration algorithm, such as a locally fair or globally fair arbitration algorithm.

To reduce the length of the dependency chain, a second dateline may be introduced. The two datelines, referred to herein as "dual-datelines," may be separated by half the diameter of the ring network. For example, and as illustrated in ring network 300 of FIG. 3, which may be compared to ring networks 100 and 200, a first dateline 320 is positioned after the third node (305) and the second dateline 322 is positioned after node5 311 of the six-node ring network 300. In this regard, the first dateline 320 is positioned between node2 305 and node3 307, and the second dateline 322 is positioned between node5 311 and node0 301. Thus, there are three nodes positioned on each side of the datelines, with nodes 301, 303, and 305 being positioned between the second dateline 322 and the first dateline 320 and nodes 307, 309, and 311 being positioned between the first dateline 320 and the second dateline 322.

Figure 3:
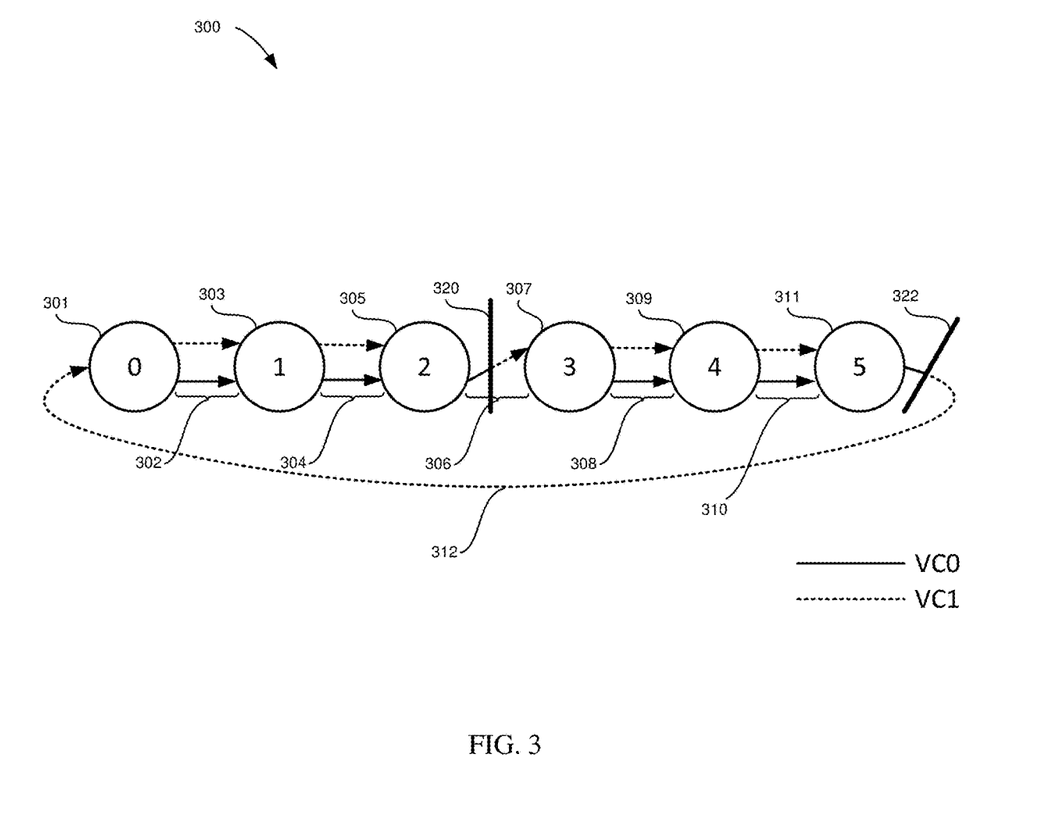
FIG. 3 illustrates an example ring network having dual datelines, in accordance with aspects of the disclosure.

Like ring network 200, ring network 300 includes six nodes 301-311, and physical links between each adjacent node, including physical links 302, 304, 306, 308, 310, and 312. Each physical link includes two virtual channels VC0 (illustrated as a solid line) and VC1 (illustrated as a dashed line), with the exceptions of transition links 312 and 306.

As data packets traverse network 300, the routing algorithm may initially route the data packets on VC0. However, in the event a data packet crosses the first dateline 320 or the second dateline 322, the routing algorithm may switch the routing of the data packet to VC1. The routing algorithm may then route the data packet on VC1 to its destination node. A data packet may traverse, at most, two physical links on VC0 before being transitioned to VC1. For example, a data packet may be transmitted from node0 301 to node5 311. In this example, the data packet may traverse physical links 302 and 304 on VC0, but then be transitioned to VC1 when crossing the first dateline 320 at physical link 306. The data packet may then traverse physical links 308 and 310 on VC1 before reaching destination node5 311. In contrast, and referring to FIG. 2, a data packet may traverse five physical links before transitioning from VC0 to VC1. In this regard, a data packet may be transmitted on VC0 over the physical links from node0 201 to node5 211, including physical links 202, 204, 206, 208, and 210. Although FIG. 3 illustrates only two datelines in ring network 300—the first dateline 320 and the second dateline 322-ring networks may include any number of datelines, Balancing Better balancing of data packet traffic on the virtual channels may be achieved by routing data packets that will not cross a dateline to the second virtual channel VC1. In this regard, data packets that will not cross a virtual channel may be transitioned from VC0 to VC1 when the data packet is N hops from its destination node. The value of N may be based on the size of the ring network (e.g., the number of nodes in the ring network) and the expected packet traffic patterns.

Balanced VC usage may be determined based on an assumed traffic pattern. In this regard, different types of traffic patterns may use each VC differently. For example, a network with an all-to-all traffic pattern may have different balancing needs than a network with all-to-one or other such traffic patterns. In the examples used herein, global all-to-all traffic patterns are discussed. In a network implementing a global all-to-all traffic pattern, each network node can receive data packets from every other network node and transmit data packets to every other network node.

Queuing structures, including turn and dimension queues, may route data packets through the network. In this regard, networks may use these queuing structures to direct data packets as the data packets traverse the network. The turn queue may be used to direct data packets as they turn from one dimension of the torus network to the next. For instance, the turn queue may be used to direct a data packet received by a node on a first dimension onto another dimension. Dimension queues may direct data packets continuing along a single dimension of the network and on a virtual channel. For instance, the dimension queue may direct a data packet from one node to another along the same dimension and on a common virtual channel, such as VC0 or VC1. The queuing structures may be part of the node or a component connected to the node. For instance, the queueing structures may be part of a router or other network interface integrated into a node.

Figure 4:
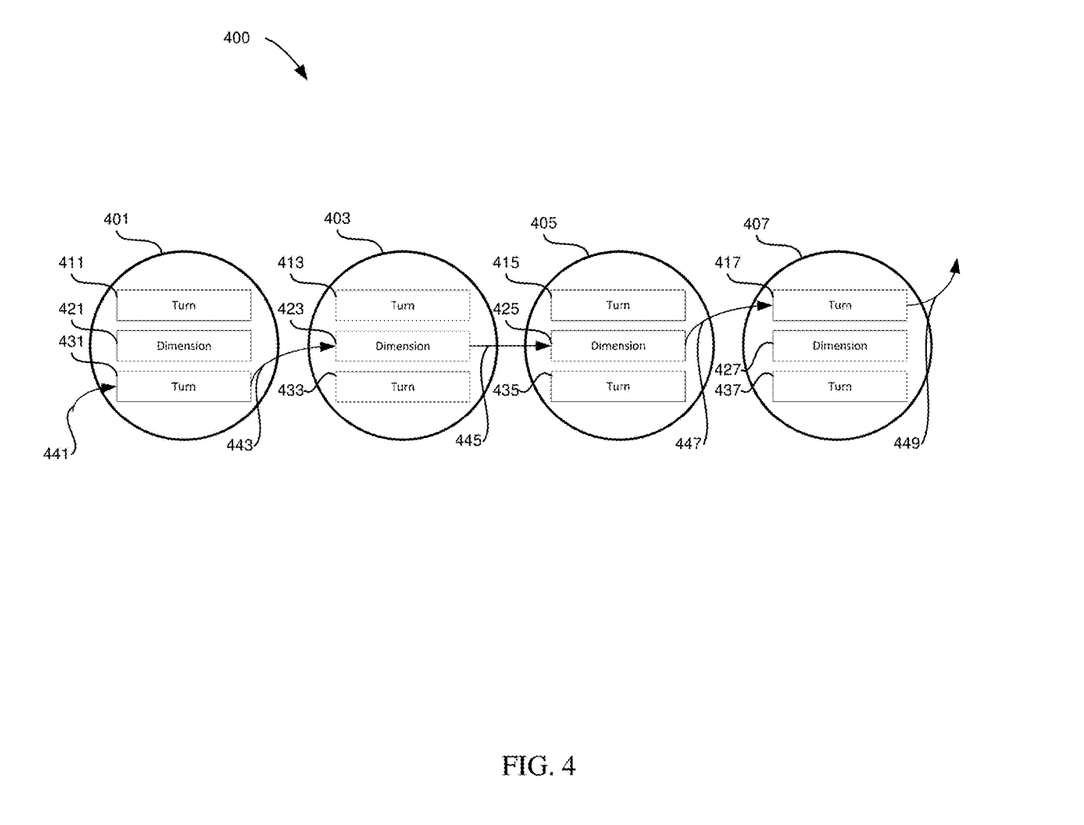
FIG. 4 illustrates an example ring network having nodes with queueing structures, in accordance with aspects of the disclosure.

FIG. 4 illustrates queuing structures within nodes 401, 403, 405, and 407 of a network 400. As shown, each node includes queuing structures. In this regard, node 401 includes turn queues 411, 431 and dimension queue 421, node 403 includes turn queues 413, 433 and dimension queue 423, node 405 includes turn queues 415, 435 and dimension queue 425, and node 407 includes turn queues 417, 437 and dimension queue 427. Turn queues 431, 433, 435, 437 and 411, 413, 415, 417 may direct data onto and off of dimensions of the torus network.

As further illustrated in FIG. 4, an example data packet is shown as entering, progressing through, and exiting the network 400 by arrows 441, 443, 445, 447, and 449. In this regard, arrow 441 illustrates the data packet entering node 401 via turn queue 441. The data packet is transmitted from node 401 to dimension queue 423 in node 403, as illustrated by arrow 443. From node 403, the data packet is transmitted to dimension queue 425 of node 405, as illustrated by line 445. The data packet is then transmitted to turn queue 417 in node 407, where it is subsequently transmitted out, as indicated by arrow 449.

The data packet in the example shown in FIG. 4 makes three "hops." A hop is a transmission from one node to another node. In FIG. 4, the three hops are the transmission from node 401 to node 403, from node 403 to node 405, and from node 405 to node 407. In instances where a data packet is limited to 0 or 1 hops along a network, the data packet would be limited to using turn queues. In this regard, the data packet would not use any dimension queues, as the data packet would be egressing or ingressing dimensions of the torus ring network using turn queues.

Figure 5:
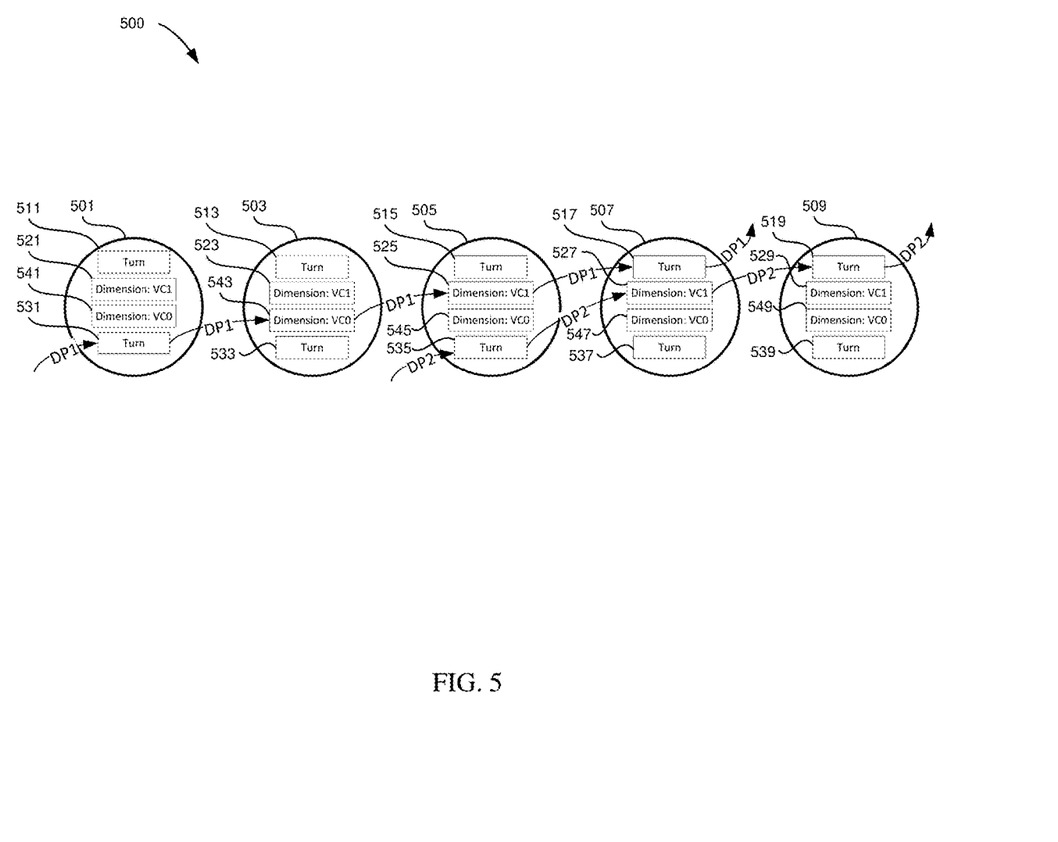
FIG. 5 illustrates data packets traversing a ring network in accordance with aspects of the disclosure.

Referring to network 500 in FIG. 5, the dimension queues in each node 501, 503, 505, 507, and 509 may be assigned a virtual channel for routing along a dimension of the ring network. In this regard, dimensions queues 521, 523, 525, 527, and 529 of nodes 501-509, respectively, are assigned VC1. Dimension queues 541, 543, 545, 547, and 549 of nodes 501-509, respectively, are assigned VC0. Data packets traveling between nodes on the same virtual channel, e.g., VC0 or VC1, would pass between dimension queues having the same assigned virtual channel. For instance, a data packet passing between node 503 and 505 on virtual VC0 would pass from dimension queue 543 to dimension queue 545. Similarly, a data packet passing between node 503 and 505 on virtual channel VC1 would pass from dimension queue 523 to dimension queue 525.

For data packets traveling h≥2 hops, the data packets use h−1 dimension queue(s) along their routes. As all-to-all traffic is symmetric, the total usage of the dimension queues may be determined by summing over the routes that are at least two hops:

$$\text{Total dimension queues} = \text{sum\_}\{h > 1\}(h-1)*t(h)$$

where h is the number of hops and t(h) is the fraction of traffic that travels h hops along the dimension queues. The units of this sum are the average number of data packets that enter the dimension queues on a node when a single packet is injected at each node in the ring network.

For all-to-all traffic in a torus ring network, with an even number of nodes k along its dimensions:

$$t(h) = \begin{cases} 1/k & \text{if } 0 <= h < k/2, \text{ else} \\ 1/2k & \text{if } h = k/2, \text{ else} \\ 0 & \end{cases}$$

To balance load between the two VCs dedicated to the dimension queues VC0 and VC1, the routing algorithm may have a threshold T defined. Any data packet with T or fewer hops remaining in its route, and not going to pass a dateline, may be placed into VC1. Otherwise, the data packet may use VC0.

FIG. 5 shows a 3-hop route of data packet 1, illustrated by arrows labeled DP1 over network 500. In this regard, data packet 1 enters node 501 into the turn queue 531. Data packet 1 is then transmitted to node 503 by the turn queue 531 to dimension queue 543 and onto VC0. From the dimension queue 543, data packet 1 is transmitted to dimension queue 525 of node 505 and onto VC1. From dimension queue 525, data packet 1 is transmitted to turn queue 517 of Node 507, where it is subsequently taken off of the network 500.

FIG. 5 further shows a 2-hop route of data packet 2, illustrated by arrows labeled DP2, over network 500. In this regard, data packet enters network 500 via node 505 into turn queue 535. From turn queue 535 data packet 2 is transmitted to dimension queue 527 of node 507 and onto VC1. From dimension queue 527 the data packet is transmitted to turn queue 529 of node 509, where it is subsequently taken off of the network 500.

The routing of data packet 1 and data packet 2 is based on the routing algorithm of network 500 having a threshold of T=1. Thus, data packet 1 is initially routed onto VC0 in node 503, as data packet 1 has 2-hops remaining. It is not until data packet 1 reached node 505, when data packet 1 has 1-hop remaining, equaling the threshold value of 1, that it gets routed onto VC1. If the threshold value were 2-hops, data packet 1 would have been routed onto VC1 at node 503.

With reference to the 2-hop route of data packet 1, the data packet is immediately routed onto VC1, since data packet 2 has a 1-hop remaining, equaling the threshold value of 1 when it reaches node 507.

As network 500 is not shown to include a dateline, no consideration of a dateline is made in the routing of the data packets over network 500. However, if a date line were present, data packets 1 and 2 would only switch to VC1 at the threshold value if the data packets were not to later cross a dateline. The number of datelines a packet may cross may be determined by performing a table lookup. In this regard, the number of datelines along a route to a destination node may be stored in the RAM memory table routes. Accordingly, the number of datelines to be traversed by a data packet to a destination node may be determined by using the destination of the data packet to index a table and lookup the number of datelines along the route to the destination, as stored in the table.

To compute a threshold value that balances load between the dimensions VC0 and VC1, the total load on the dimension queues may be divided into the load contributed by data packets with h hops remaining, which is defined as:

$$r(h) = \text{sum\_}\{i > h\}t(i).$$

Every packet that travels two or more hops, for example, will eventually have one hop remaining. Thus, the sum of the fraction of the traffic for each of these hops (i.e., r(1)=t(1)+t(2)+ . . . ) may be determined to find the utilization of the dimension queues contributed by packets with one hop remaining. Since every packet has some number of hops remaining, summing over r(h) recovers the total load as computed above:

$$\text{total} = \text{sum\_}\{h > 0\}r(h)$$

A T may then be selected to minimize the imbalance between the two VCs:

$$\text{minimize}|\text{sum\_}\{h>T\}r(h)-\text{sum\_}\{0<h\leq T\}r(h)|$$

Example values of threshold T have been computed using the above equations for different sized rings in table 1, below:

TABLE 1

| Ring Size (k) | Threshold (T) |
| --- | --- |
| 4 | 0 |
| 8 | 1 |
| 12 | 1 |
| 16 | 2 |
| 24 | 3 |
| 32 | 4 |

Empirically, there is a linear relationship between ring size and the calculated threshold value (T). Thus, selecting a threshold value, where (T)=round(0.145·k−0.3) may yield a result for rings where k is a multiple of 4 and where the network includes up to 64 nodes.

The concepts from the previous section can be extended to twisted tori with appropriate definitions for the t(h) function. Example values of threshold T for twisted tori networks have been computed using the equation for different size rings in table 2, below:

TABLE 2

| | Threshold (T) | |
| --- | --- | --- |
| Ring Size (k) | 2k × k × k | 2k × 2k × k |
| 4 | 1 | 1 |
| 8 | 1 | 2 |
| 12 | 2 | 3 |
| 16 | 3 | 3 |
| 24 | 4 | 5 |
| 32 | 5 | 7 |

As with torus ring networks, there is a linear relationship between ring size and the calculated threshold value (T) for twisted tori networks. In this regard, a threshold value (T), for values of k≤64, may be determined using one of the following equations:

$$2k \times k \times k: \text{threshold} = \text{round}(0.175 \cdot k - 0.15) \quad (1)$$

$$2k \times 2k \times k: \text{threshold} = \text{round}(0.222 \cdot k - 0.1) \quad (2)$$

In some instances, datelines may be removed from a ring network routing algorithm. By removing datelines, improved throughput through the network may be achieved, in particular when direct memory access (DMA) size increases. Certain conditions may be met before datelines are removed. These conditions may include (1) the network includes eight or fewer nodes in the ring (this corresponds to k≤4 for twisted tori network); (2) VC usage is balanced using the balancing techniques described herein; and (3) when there are eight nodes in the ring (also applies to k=4 twisted tori), the nodes alternate between positive direction and negative direction tiebreaking for the routes that go exactly halfway around the ring.

In networks having more than 8 nodes, networks where VC balancing is disabled, or networks where tiebreaking does not alternate, the acyclic dependencies of the VC are lost and VC0 to VC0 dependencies appear between all nodes, necessitating a dateline (or other approach) to break the VC0 cycle.

Figure 6:
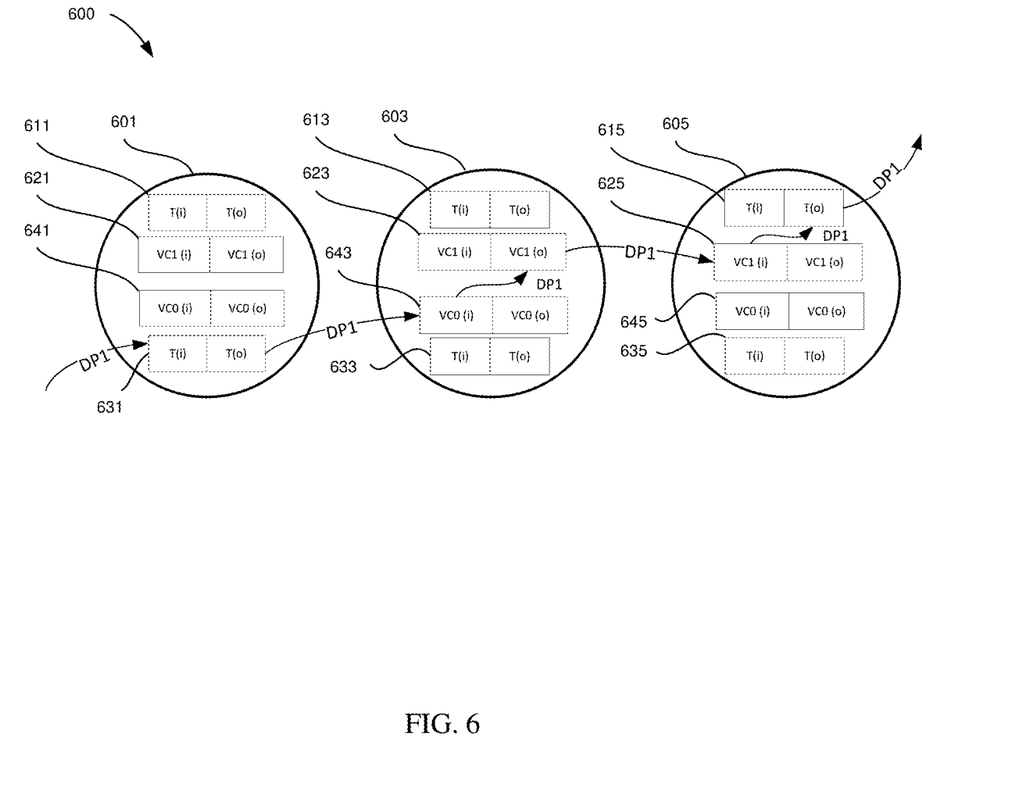
FIG. 6 illustrates data packets traversing a ring network in accordance with aspects of the disclosure.

In some embodiments, nodes may include queuing structures with input and output queues. In this regard, and unlike input or output queued architectures, such as described in FIGS. 4 and 5, a data packet at each hop travels through an input and an output queue. These pairs of queues may be split into their associated dimension. For instance, and as illustrated in FIG. 6, within the combined input-output queuing architecture of network 600, the nodes may include a turn from a previous dimension, such as turns 631, 633, 635 of nodes 601, 603, and 605, turns to next dimensions, such as turns 611, 613, and 615 of nodes 601, 603, and 605. Additionally, the nodes may include dimension queuing structures associated with the virtual channels, such as queuing structures 641, 643, and 645 associated with VC0 in nodes 601, 603, and 605, respectively. Additionally, nodes 601, 603, and 605 include queuing structures 621,623, and 625 associated with VC1, respectively.

As further shown in FIG. 6, each queueing structure may be split into input queues, identified by "(i)" and output queues, identified by "(o)". For instance, dimension queueing structure 621 includes VC1 (i), the input queue, and VC1 (o), the output queue. During the transmission of a data packet, the data packet passes through both an input queue and an output queue. For instance, data packet 1, labeled DP1 in FIG. 6, passes through the turn 631 queueing structure, including through the input queue, labeled as T(i) and the output queue, labeled as T(o).

As also shown in FIG. 6, a transition between VCs occurs when a packet goes from an input queue to an output queue. In this regard, DP1 may pass from VC0 (i) (an input queue) to VC1(o) (an output queue) in node 603. VC1 (o) may subsequently pass DP1 to input queue VC1 (i) of node 605. Within node 605, the data packet may be passed to T(o).

Figure 7:
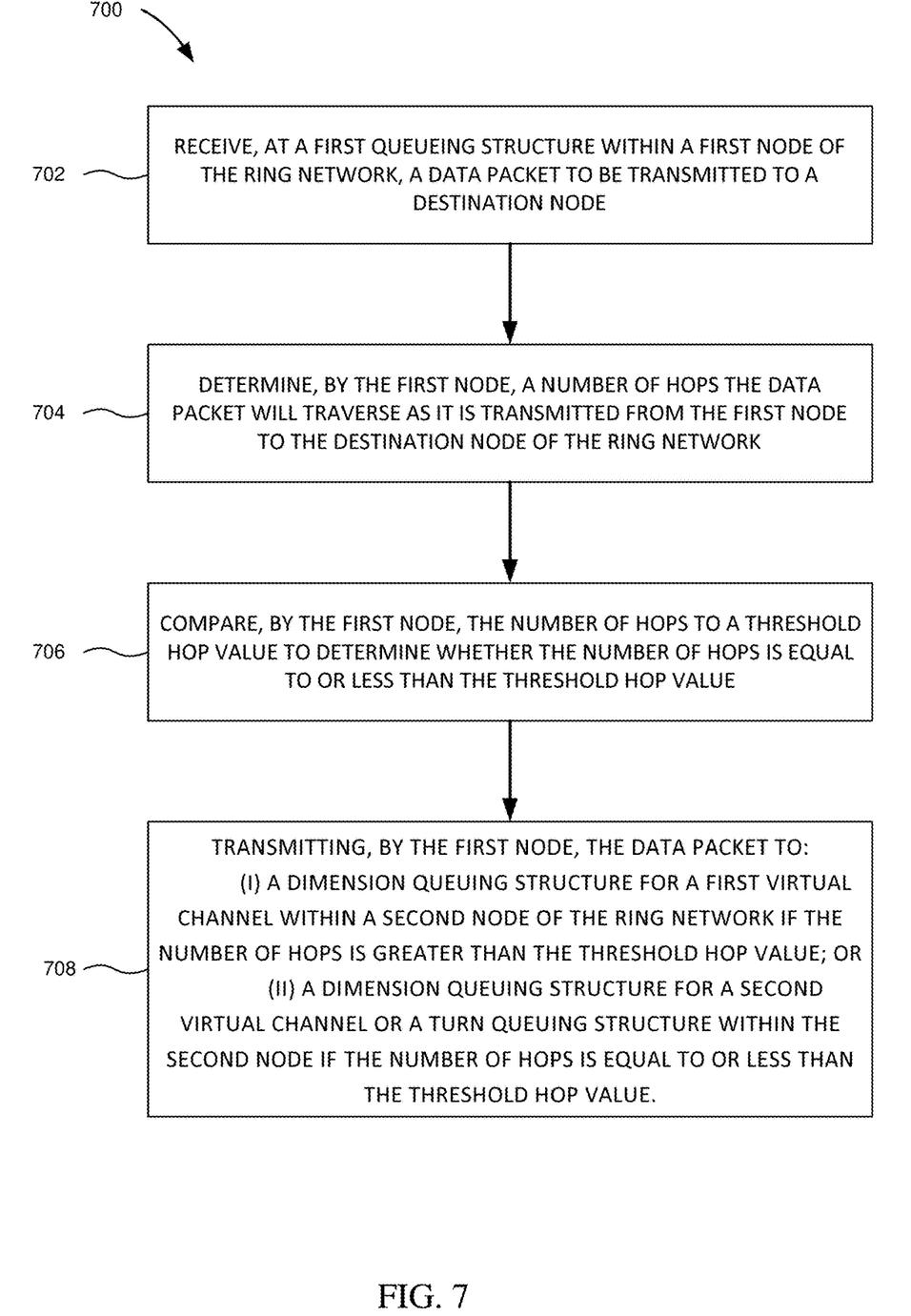
FIG. 7 is a flow diagram illustrating a method for transmitting data packets over a network, according to aspects of the disclosure.

FIG. 7 illustrates a flow diagram 700 for routing data packets in a network. In block 702, a data packet is received at a first queueing structure within a first node of the ring network. The data packet is to be transmitted to a destination node on the network. In block 704, the first node determines a number of hops the data packet will traverse as it is transmitted from the first node to the destination node of the ring network. In block 706, the first node compares the number of hops to a threshold hop value to determine whether the number of hops is equal to or less than the threshold hop value. In block 708, the first node transmits the data packet to (i) a dimension queues structure for a first virtual channel within a second node of the ring network if the number of hops is greater than the threshold hop value; or (ii) a dimension queues structure for a second virtual channel or a turn queuing structure within the second node if the number of hops is equal to or less than the threshold hop value.

Although the foregoing examples illustrate ring networks, such as ring networks 100, 200, 300, 400, 500, and 600 the technology described herein may be applicable to other ring-based network topologies such as multiple ring-based topologies (e.g., "torus" and "twisted torus") topologies.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including," and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of routing data packets within a ring network, the method comprising:
   receiving, at a first node of the ring network, a data packet to be transmitted to a destination node, the first node comprising a dimension queueing structure for a first virtual channel, a dimension queueing structure for a second virtual channel, and a first turn queueing structure;
   determining, by the first node, a number of hops the data packet will traverse as it is transmitted from the first node to the destination node of the ring network;
   comparing, by the first node, the number of hops to a threshold hop value to determine whether the number of hops is equal to or less than the threshold hop value; and
   transmitting, by the first node, the data packet to a second node comprising a dimension queueing structure for the first virtual channel, a dimension queueing structure for the second virtual channel, and a second turn queueing structure, the transmitting comprising sending the data packet to:
   (i) the dimension queuing structure for the first virtual channel within the second node of the ring network if the number of hops is greater than the threshold hop value; or
   (ii) the dimension queuing structure for the second virtual channel or the second turn queuing structure within the second node if the number of hops is equal to or less than the threshold hop value.

2. The method of claim 1, wherein the data packet is transmitted to the turn queueing structure within the second node when the second node is the destination node.

3. The method of claim 1, wherein the network includes a first dateline and a second dateline.

4. The method of claim 3, wherein the first dateline and the second dateline are each positioned between a pair of network nodes on the ring network, wherein a number of nodes positioned between the first dateline and the second dateline matches a number of nodes positioned between the second dateline and the first dateline.

5. The method of claim 1, further comprising:
determining whether the data packet will traverse a dateline as it is transmitted from the first node to the destination node.

6. The method of claim 5, wherein the data packet is transmitted to the dimension queueing structure for the second virtual channel within the second node when it is determined the data packet will traverse the dateline.

7. The method of claim 5, further comprising:
determining, by the second node after receiving the data packet, a second number of hops the data packet will traverse as it is transmitted from the second node to the destination node of the ring network;
comparing, by the second node, the number of hops to the threshold hop value to determine whether the second number of hops is equal to or less than the threshold hop value; and
transmitting, by the second node, the data packet to:
  (i) a dimension queuing structure for the first virtual channel within a third node of the ring network if the number of hops is greater than the threshold hop value; or
  (ii) a dimension queuing structure for a second virtual channel or a turn queuing structure within the third node if the number of hops is equal to or less than the threshold hop value.

8. The method of claim 1, wherein the data packet is transmitted to the turn queueing structure within the third node when the third node is the destination node.

9. The method of claim 1, wherein the network is a ring network, comprising a torus ring or a twisted tori.

10. The method of claim 1, wherein the first and second turn queueing structures are used to direct the data packet from one dimension to another dimension.

11. A ring network comprising:
a first hardware node comprising a dimension queueing structure for a first virtual channel, a dimension queueing structure for a second virtual channel, and a first turn queueing structure;
a second node comprising a dimension queuing structure for the first virtual channel, a dimension queuing structure for the second virtual channel, and a second turn queueing structure; and
a destination node, wherein the first hardware node is configured to:
  receive, at the first queueing structure, a data packet to be transmitted to the destination node;
  determine a number of hops the data packet will traverse as it is transmitted from the first hardware node to the destination node of the ring network;
  compare the number of hops to a threshold hop value to determine whether the number of hops is equal to or less than the threshold hop value; and
  transmit the data packet to:
    (i) the dimension queueing structure for the first virtual channel within the second node if the number of hops is greater than the threshold hop value; or
    (ii) the dimension queueing structure for the second virtual channel or the second turn queuing structure within the second node if the number of hops is equal to or less than the threshold hop value.

12. The ring network of claim 11, wherein the network includes a first dateline and a second dateline.

13. The ring network of claim 12, wherein the first dateline and the second dateline are each positioned between a pair of network nodes on the ring network, wherein a number of nodes positioned between the first dateline and the second dateline matches a number of nodes positioned between the second dateline and the first dateline.

14. The ring network of claim 13, wherein the ring network includes more than eight nodes.

15. The ring network of claim 11, wherein the first hardware node is further configured to: determine whether the data packet will traverse a dateline as it is transmitted from the first hardware node to the destination node.

16. The ring network of claim 15, wherein the data packet is transmitted to the dimension queueing structure for the second virtual channel within the second node when it is determined the data packet will traverse the dateline.

17. The ring network of claim 15, wherein the second node is configured to:
determine, after receiving the data packet, a second number of hops the data packet will traverse as it is transmitted from the second node to the destination node of the ring network;
compare, by the second node, the number of hops to the threshold hop value to determine whether the second number of hops is equal to or less than the threshold hop value; and
transmit the data packet to:
  (i) a dimension queuing structure for the first virtual channel within a third node of the ring network if the number of hops is greater than the threshold hop value; or
  (ii) a dimension queuing structure for the second virtual channel or a turn queuing structure within the third node if the number of hops is equal to or less than the threshold hop value.

18. The ring network of claim 17, wherein the data packet is transmitted to the turn queue structure within the third node when the third node is the destination node.

19. The ring network of claim 11, wherein the ring network is a torus ring or a twisted tori.

20. The ring network of claim 11, wherein the first and second turn queueing structures are used to direct the data packet from one dimension to another dimension.

* * * * *